Nov. 6, 1951     W. F. MORGAN     2,574,278
AUTOMATIC CIRCUIT CLOSER FOR ELECTRICAL WIRING SYSTEMS
Filed July 3, 1950
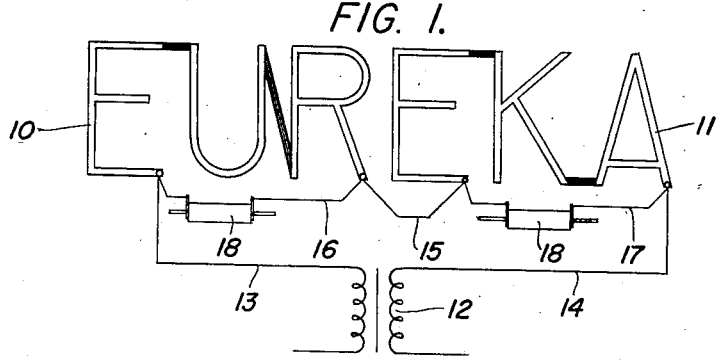
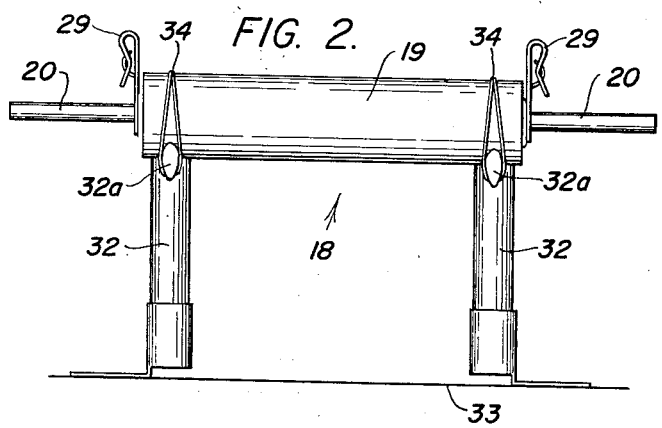
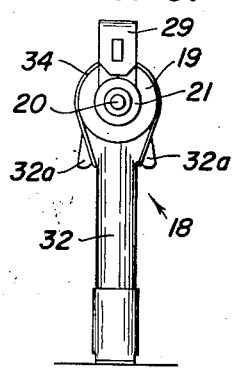
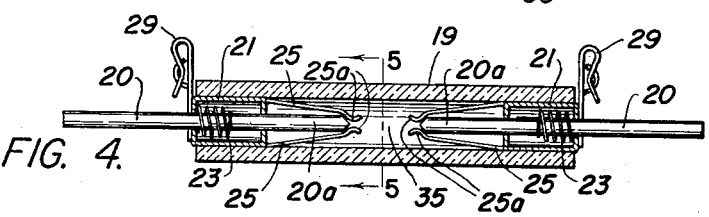
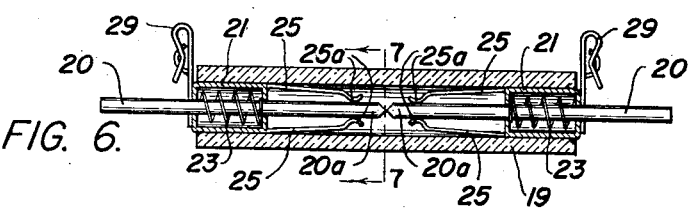
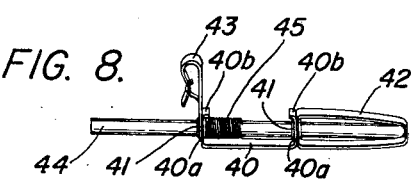
Inventor
WALTER F. MORGAN Patented Nov. 6, 1951

2,574,278

UNITED STATES PATENT OFFICE 2,574,278

AUTOMATIC CIRCUIT CLOSER FOR ELECTRICAL WIRING SYSTEMS

Walter F. Morgan, Santaquin, Utah

Application July 3, 1950, Serial No. 171,850

12 Claims. (Cl. 200—118)

This invention relates to electrical devices for automatically closing circuits in electrical wiring systems, and is directed particularly to safety devices whereby a normally open by-pass circuit in an electrical wiring system may be automatically closed under the influence of line voltage when the main circuit is broken.

Devices of this type are especially useful in connection with luminous tube electrical signs, better known as neon signs, in which tube breakage ordinarily creates a dangerous fire hazard because of the likelihood of electrical arcing or short circuiting.

I am aware that the use of such devices in the wiring systems of luminous tube electrical signs is old, but devices heretofore provided for the purpose have not achieved wide-spread commercial success for various reasons. For example, certain of these devices are not positive in operation; some are too expensive to produce or to install; others are either operative a single time and must be replaced thereafter, or are inconvenient to re-set following any given activation thereof.

It is a principal object of the present invention, therefore, to provide an improved device of the kind specified which is absolutely positive in operation, is inexpensive to produce and install, and can be used over and over again following activation by merely re-setting certain resiliently actuated parts thereof.

In accordance with the invention, and in a presently preferred form thereof, a pair of opposingly positioned and resiliently-urged plungers are normally held spaced apart, within and longitudinally of an enclosing housing of insulation, by means of respective thermally responsive restraining elements. The plungers are electrically conductive, and serve as movable electrical contacts which are forcibly pushed together when voltage across the gap heats and opens the thermally responsive restraining elements. The device is re-set by merely pulling back the plungers manually.

Additional objects and features of the invention will become apparent from the following detailed description of the particular preferred embodiment illustrated in the accompanying drawing to exemplify the novel structural concepts hereinafter claimed.

In the drawing:

Fig. 1 diagrammatically illustrates a so-called neon sign, together with the electrical wiring system therefor, automatic circuit closing devices of the invention being shown appropriately installed in by-pass circuits of such wiring system;

Fig. 2, an elevation of one of the automatic circuit closing devices and supports shown in Fig. 1, the view being taken longitudinally of the device and being drawn to a considerably enlarged scale;

Fig. 3, an end elevation of the device of Fig. 2;

Fig. 4, a vertical section taken axially through the device of Figs. 2 and 3, the supporting standards being omitted, and the component parts being shown in the positions occupied during a normal or open condition of the device;

Fig. 5, a transverse section taken on the line 5—5 of Fig. 4;

Fig. 6, a view corresponding to that of Fig. 4, but illustrating the several parts in the positions they occupy following an automatic closing of the device due to a break in the portion of the neon sign of Fig. 1 protected by the device;

Fig. 7, a transverse section taken on the line 7—7 of Fig. 6; and

Fig. 8, a perspective view of another embodiment of restrained conductor assembly of the invention.

Referring to the drawing: the electrical wiring arrangement accompanying the neon sign of Fig. 1 is typical of wiring systems in which the device of the invention may be usefully incorporated. As illustrated, the neon sign proper is divided into two independent luminous tube portions 10 and 11, both portions being supplied in common with electricity from any suitable source of same through a customary transformer 12.

The main circuit extends from respective output terminals of the transformer 12 through respective leads 13 and 14, through the gas-discharge tubes of the two sign portions 10 and 11, and through an interconnecting jumper 15.

For the purpose of utilizing the safety device of the invention, by-pass circuits 16 and 17 connect opposite ends of the jumper 15 directly with the leads 13 and 14, respectively.

Series-connected in each of the by-pass circuits 16 and 17 is one of the automatic circuit closing devices of the invention, the same being indicated generally 18. Thus, if any break should occur in one or the other of the portions 10 and 11 of the sign, the line voltage will cause electrical current to jump the gap normally existing in the otherwise conductive path provided by the device 18, thereby creating the necessary heat to initiate closing of such gap. In this event, the particular by-pass circuit concerned becomes a closed circuit for by-passing electricity from the damaged portion of the sign. It can accordingly be seen that the device of the invention becomes a potent factor in safeguarding against short circuits otherwise likely to occur within the damaged portion of the sign itself.

The automatic circuit closing device 18 comprises a length of tubing 19 formed from electrical insulation material, preferably a ceramic or glass. The opposite ends of the tube 19 are open, and inserted snugly therein are respective assemblies comprising resiliently actuated electrical conductors normally maintained in mutual separated relationship by thermally responsive restraining means.

In the preferred form illustrated, the movable electrical conductors are rods 20 of electrically conductive material, preferably copper or the like. These are fitted within respective slideway structures, each of which, in the particular instance illustrated, is made up of a tube 21 having opposite ends closed, but centrally apertured in mutual alignment, to provide spaced slideways 22 for the particular conductor rod 20 concerned. Within the hollow interior of the tube 21, a compression spring 23 encircles the conductor rod 20, such spring having its rearward end abutting freely against the corresponding closed end of the tube 21, and having its opposite end abutting freely against a shouldered portion 24 of the conductor rod.

That end 20a of conductor rod 20 which protrudes forwardly from the slideway tube 21 normally abuts against the normally interengaging ends 25a of a pair of thermally responsive members 25, which form a normally restraining cage about such forward end 20a of the conductor rod. The mutually opposing, thermally responsive members 25 may be anchored to the forward end of slideway tube 21 in any desired manner, but advantageously they stem integrally from a circular central member 26 which is centrally apertured and secured to a similarly configurated plate 27 by means of an eyelet 28, the plate 27 being inserted within and suitably secured to the forward end of the slideway tube 21, as by means of an oversize friction fit, so as to provide the apertured closed end of such tube and one of the slideways 22. In this way, the members 25 may be economically provided by a single stamping of suitable, thermally responsive metal. In this connection, it should be noted that the members 25 are advantageously of strip formation, elongate and resilient in character, so that they are normally urged together at their ends 25a, acting in effect as leaf springs, but are expanded from such contracted position under the action of heat.

At the rearward end of the conductor-slideway unit, a binding post 29, preferably of the customary resilient clamp type illustrated, is secured in good electrical connection with the slideway tube 21 for the purpose of providing handy electrical connection of the circuit leads to the device. While the connection of binding post 29 to the slideway tube may be made in any suitable manner, it is advantageous that an eyelet 30 be utilized to attach such binding post 29 to a circular, apertured plate 31, which is, in turn, secured in any suitable manner, as by means of an oversize friction fit, within the rearward end of slideway tube 21, thereby closing that end of such tube and providing the other of the slideways 22.

The conductor-slideway assemblies are conveniently pushed into tight frictional engagement with the tube 19, the diameter of slideway tubes 21 being selected with this in mind, or a suitable adhesive may be employed between slideway tube and outer tube for purposes of securement. Naturally, other suitable ways of securing the conductor-slideway assemblies within the outer tube 19 are also available.

The entire device 18, as so constructed, is advantageously mounted on spaced standards 32 rising from the base plate 33 of the neon sign, or from the surface upon which the sign is supported. Such standards 32 are preferably those commonly employed for supporting the neon tubes themselves, and, since they are well known and may be purchased on the open market, are not here described in detail. The device 18 is secured to the receiving cradles 32a of such standards 32 by the customary wire bindings 34.

In operation, the line voltage spanning gap 35, Fig. 4, between opposite forward ends of the respective conductor rods 20, creates heat, which acts upon the thermally responsive members 25 of the restraining cages of the respective conductor-slideway assemblies to expand such members 25 and open the otherwise restraining cages, somewhat as shown in Fig. 6. Expanding of such members 25, and consequent opening of the restraining cages formed thereby, permits the compression springs 23 of the opposing conductor-slideway assemblies to expand and force their associated conductor rods 20 forwardly beyond the respective restraining cages and into close electrical contact with each other. Accordingly, a direct conductive path for the flow of line current is provided in the particular by-pass circuit concerned. This condition is maintained until the damaged portion of the sign is repaired and the respective conductor rods 20 are manually pulled rearwardly to re-set the device as it appears in Fig. 4.

While I have found it advantageous to utilize pairs of opposing conductor-slideway assemblies in the manner described above, reasonably satisfactory results for various purposes may be had by the use of a fixed conductor element at one end of the insulating tube 19 in place of one of the pair of normally restrained and resiliently actuated conductor rods shown.

Furthermore, I have found that the form of restrained conductor assembly illustrated in Fig. 8 is capable of being more readily manufactured and can be produced at a lower cost than the previously described assembly. In the assembly of Fig. 8, the slideway tube 21 is replaced by a slideway structure 40 formed by merely bending a flat, elongate strip of conductive metal, such as copper, into the substantially rectangular box shape illustrated. Thus, such slideway structure 40 possesses a pair of longitudinally spaced standards 40a, which are centrally apertured to receive respective eyelets 41, and a pair of inturned flanges 40b extending from the respective standards 40a.

A thermally responsive, restraining cage 42, corresponding to that formed by the elements 25 of the foregoing embodiment, is operatively secured to one of the standards 40a by means of an eyelet 41, while a binding post 43, similar to that indicated 29 in the foregoing embodiment, is fastened in good electrical engagement to the other standard 40a by means of an eyelet 41.

A rod conductor 44, corresponding to that indicated 20 in the previous embodiment, is slideably mounted in the eyelets 41 of the slideway structure 40 in the manner of the said previous embodiment. A spring 45 has one of its ends abutting against the slideway member, as shown, and the other end anchored within a suitable receiving hole drilled in the conductor rod.

Such restrained conductor assembly is adapted to be frictionally mounted in the open end of an insulating tube similar to that indicated 19 in the foregoing embodiment. The longitudinal edges of the slideway structure 40, including those of the inwardly-turned flange portions 40b thereof, provide the desired frictional engagement with the inner wall surface of the tube. If desired, the end of the tube may be additionally sealed about the slideway structure, for example, by heat-crimping where the tube is formed of glass.

While it is preferred that the conductor rod of each restrained conductor assembly be of cage formation, as illustrated in both of the above instances, satisfactory though generally less positive results may be had by utilizing restraining means of other than cage formation, for example, structure resulting from merely eliminating one of the members 25, the remaining member 25 being relied upon to accomplish the entire restraining action.

It is preferred that standard types of bi-metal be utilized in the fabrication of the thermally responsive restraining means.

Whereas this invention is here illustrated and described with respect to a particular preferred embodiment thereof, it should be understood that various changes, apart from the mere substitutions of equivalents, may be made therein and various other constructions may be adopted on the basis of the teachings hereof, by those skilled in the art, without departing from the protective scope of those of the following claims which are generic to the broader inventive concepts disclosed.

I claim:

1. An automatic circuit closing device for electrical wiring systems, comprising a tube of electrical insulating material; a pair of electrical conductors mounted in spaced, mutual opposition at opposite ends of said tube, at least one of said electrical conductors being in the form of an elongate element mounted for sliding movement toward and away from the other of said electrical conductors; slideway means mounting said movable conductor within and longitudinally of said tube; resilient means normally urging said movable conductor toward said other of said conductors; a thermally responsive, expanding and contracting cage normally closed in contracted position about the said movable conductor, restraining movement of said conductor toward and into contact with said other conductor, but expandable to open, non-restraining position by the heat of electricity crossing the gap between said conductors; and means for electrically connecting the respective electrical conductors with opposite leads of an electric circuit.

2. The combination recited in claim 1, wherein the movable conductor is a rigid rod, the slideway means is a tube closely fitted within an end of the insulating tube and having its opposite ends closed by members which are centrally apertured as slideways for said rod, and the resilient means is a spring operably associated with said rod within said slideway tube.

3. The combination recited in claim 2, wherein the expanding and contracting cage for normally restraining movement of said movable conductor rod comprises mutually opposite strips of thermally responsive material extending longitudinally from the inner end of said slideway tube and normally closing together over the forward end of said movable conductor rod.

4. The combination recited in claim 3, wherein the said strips of thermally responsive material stem integrally from a centrally apertured intermediate portion, and an eyelet secures said portion to a centrally apertured closure plate, said eyelet providing a slideway for said movable conductor rod.

5. The combination recited in claim 1, wherein the movable conductor is a rigid rod, the slideway means is an electrically conductive tube closely fitted within an end of the insulating tube and having its opposite ends closed by members which are centrally apertured as slideways for said rod, at least the outer of said members being electrically conductive.

6. The cmbination recited in claim 5, wherein the said outer of said members comprises a centrally apertured closure plate which is electrically conductive, the means for electrically connecting the movable conductor rod with a lead of an electrical circuit is a binding post, and an electrically conductive eyelet secures said binding post to said plate and provides a slideway for said conductor rod.

7. An automatic circuit closing device for electrical wiring systems, comprising a tube of electrical insulating material; a pair of electrical conductors mounted in spaced, mutual opposition at opposite ends of said tube, at least one of said electrical conductors being in the form of a rigid rod mounted for sliding movement toward and away from the other of said electrical conductors; slideway means mounting said movable conductor within and longitudinally of said tube; resilient means normally urging said movable conductor toward the other of said conductors; thermally responsive means associated with said movable conductor, only within said tube, and normally positioned to restrain said movable conductor, but deformable to non-restraining position under the influence of heat generated by electrical discharge across the gap normally existing between the said pair of conductors; and means for electrically connecting the respective electrical conductors with opposite leads from an electric circuit.

8. The combination recited in claim 7, wherein the slideway means is an open box-like structure having longitudinally spaced standards which are apertured in mutual registry; the thermally responsive restraining means is secured to the inner of said standards by an eyelet; the means for electrically connecting the movable conductor rod with a lead of an electrical circuit is a binding post, and an electrically conductive eyelet secures said binding post to the outer of said standards, said eyelets providing spaced slideways for said conductor rod.

9. The combination recited in claim 8, wherein the thermally responsive restraining means embodies at least one elongate member formed of a resilient bi-metal.

10. An automatic circuit closing device for electrical wiring systems, comprising a tube of electrical insulating material; a pair of electrical conductors mounted in spaced, mutual opposition at opposite ends of said tube, said electrical conductors being in the form of rigid rods mounted for sliding movement toward and away from each other; respective slideway means mounting said conductors within and longitudinally of said tube; respective resilient means normally urging said conductors together; respective thermally responsive means within said tube normally positioned to restrain said conductors, but deformable to non-restraining position under the influence of heat generated by electrical discharge across the gap normally existing between the said pair of conductors; and means for electrically connecting the respective electrical conductors with opposite leads from an electric circuit.

11. A thermally responsive, electrically conductive assembly, comprising a slideway structure having opposing, longitudinally spaced, transversely extending ends apertured in mutual registry; normally closed but thermally expandible restraining means fastened to one of said ends by an eyelet passing through the aperture thereof; an electrical binding post fastened to the other of said ends by an electrically conductive eyelet passing through the aperture thereof; an electrically conductive rod slidably mounted in said eyelets and having one of its end portions received by said restraining means; and a spring mounted to normally urge said rod against the restraining action of said restraining means, and effective to displace said rod upon thermal expansion of said restraining means.

12. The combination recited in claim 11, wherein the slideway structure is of open box-like formation whose opposite, longitudinally spaced ends provide slideway standards, and the spring is anchored to and surrounds said rod within the slideway structure.

WALTER F. MORGAN.

REFERENCES CITED

The following references are of record in the file of this patent:

UNITED STATES PATENTS

| Number | Name | Date |
| --- | --- | --- |
| 2,423,197 | Matson | July 1, 1947 |

FOREIGN PATENTS

| Number | Country | Date |
| --- | --- | --- |
| 64,570 | Switzerland | Apr. 7, 1913 |